US008549433B2

(12) United States Patent
Sathish et al.

(10) Patent No.: US 8,549,433 B2
(45) Date of Patent: Oct. 1, 2013

(54) METHOD AND APPARATUS FOR PROVIDING A USER INTERFACE IN ASSOCIATION WITH A RECOMMENDER SERVICE

(75) Inventors: Sailesh Sathish, Tampere (FI); Ari M. Koivisto, Tampere (FI)

(73) Assignee: Nokia Corporation, Espoo (FI)

( * ) Notice: Subject to any disclaimer, the term of this patent is extended or adjusted under 35 U.S.C. 154(b) by 180 days.

(21) Appl. No.: 13/083,085

(22) Filed: Apr. 8, 2011

(65) Prior Publication Data

US 2012/0260211 A1    Oct. 11, 2012

(51) Int. Cl.
*G06F 15/177* (2006.01)
(52) U.S. Cl.
USPC .......................................................... 715/835
(58) Field of Classification Search
USPC ................................. 715/760, 838, 762, 835
See application file for complete search history.

(56) References Cited

U.S. PATENT DOCUMENTS

| 6,633,315 | B1 | 10/2003 | Sobeski et al. |
| 6,678,891 | B1 * | 1/2004 | Wilcox et al. ................... 725/42 |
| 6,785,671 | B1 * | 8/2004 | Bailey et al. ............... 705/26.81 |
| 2004/0043758 | A1 | 3/2004 | Sorvari et al. |
| 2008/0077865 | A1 | 3/2008 | Hiles et al. |
| 2009/0164929 | A1 | 6/2009 | Chen et al. |

FOREIGN PATENT DOCUMENTS

WO    WO 2009/045899 A2    4/2009

OTHER PUBLICATIONS

International Search Report and Written Opinion for International Application No. PCT/FI2012/050190, dated May 25, 2012.
Liao, W-D., et al.; "An Intelligent Recommendation Model with a Case Study on u-Tour Taiwan of Historical Momuments and Cultural Heritage"; 2010 International Conference on Technologies and Applications of Artificial Intelligence; Hsinchu, Taiwan; Nov. 2010; pp. 72-79.

* cited by examiner

*Primary Examiner* — Thanh Vu
(74) *Attorney, Agent, or Firm* — Alston & Bird LLP

(57) ABSTRACT

A method for providing a user interface in connection with a recommendation service may include causing communication of a request for content where the request includes context information and preference information associated with a user of a device causing communication of the request, receiving a response to the request in response to the request being serviceable where the response includes a series of recommendations serialized in protocol-specific data structure, and causing rendering of content associated with the recommendations as graphical tiles according to the protocol-specific data structure such that a plurality of recommendations associated with a same primary context are associated with each other in a common channel. An apparatus and computer program product corresponding to the method are also provided.

14 Claims, 7 Drawing Sheets

METHOD AND APPARATUS FOR PROVIDING A USER INTERFACE IN ASSOCIATION WITH A RECOMMENDER SERVICE

TECHNOLOGICAL FIELD

An example embodiment of the present invention relates generally to techniques for recommending content and, more particularly, relates to an apparatus, a method and a computer program product for providing a user interface in association with a service engaged in recommending content.

BACKGROUND

In order to provide easier or faster information transfer and convenience, telecommunication industry service providers are continually developing improvements to existing communication networks. As a result, wireless communication has become increasingly more reliable in recent years. Along with the expansion and improvement of wireless communication networks, mobile terminals used for wireless communication have also been continually improving. In this regard, due at least in part to reductions in size and cost, along with improvements in battery life and computing capacity, mobile terminals have become more capable, easier to use, and cheaper to obtain. Due to the now ubiquitous nature of mobile terminals, people of all ages and education levels may utilize mobile terminals to communicate with other individuals or contacts, receive services and/or share information, media and other content.

Some of the technologies which are becoming more popular are those of location based services and other personalized services. In this regard, some technologies may provide users of properly equipped mobile terminals with content that is specific to the present location of the user. Thus, for example, the user may be provided with weather information relating to the user's present location. Thereby, content may be provided to the user which may be relevant to the user's interests and current context. However, it may still be possible to improve the provision of content to users.

BRIEF SUMMARY

A method, apparatus and computer program product are therefore provided that may provide a user interface for use in connection with a service that recommends content to users based on, for example, the user's context.

In an example embodiment, an apparatus for providing a user interface in connection with a content recommendation service may include at least one processor and at least one memory including computer program code, the at least one memory and the computer program code configured to, with the processor, cause the apparatus to perform at least causing communication of a request for content where the request includes context information and preference information associated with a user of a device causing communication of the request, receiving a response to the request in response to the request being serviceable where the response includes a series of recommendations serialized in protocol-specific data structure, and causing rendering of content associated with the recommendations as graphical tiles according to the protocol-specific data structure such that a plurality of recommendations associated with a same primary context are associated with each other in a common channel. The protocol-specific data structure may provide at least data indicative of a primary context or a combination of one or more primary contexts associated with selected ones of the recommendations, data indicative of a secondary context or a combination of one or more secondary contexts, meta-content information related to data that has been recommended, and meta content related to functional activities related to content that is connectable to specific functions of the device.

In another example embodiment, a method for providing a user interface in connection with a content recommendation service may include causing communication of a request for content where the request includes context information and preference information associated with a user of a device causing communication of the request, receiving a response to the request in response to the request being serviceable where the response includes a series of recommendations serialized in protocol-specific data structure, and causing rendering of content associated with the recommendations as graphical tiles according to the protocol-specific data structure such that a plurality of recommendations associated with a same primary context are associated with each other in a common channel. The protocol-specific data structure may provide at least data indicative of a primary context or a combination of one or more primary contexts associated with selected ones of the recommendations, data indicative of a secondary context or a combination of one or more secondary contexts, meta-content information related to data that has been recommended, and meta content related to functional activities related to content that is connectable to specific functions of the device.

In a further example embodiment, a computer program product for providing a user interface in connection with a content recommendation service may include at least one computer-readable storage medium having computer-executable program code portions stored therein, the computer-executable program code portions comprising program code instructions for causing communication of a request for content where the request includes context information and preference information associated with a user of a device causing communication of the request, receiving a response to the request in response to the request being serviceable where the response includes a series of recommendations serialized in protocol-specific data structure, and causing rendering of content associated with the recommendations as graphical tiles according to the protocol-specific data structure such that a plurality of recommendations associated with a same primary context are associated with each other in a common channel. The protocol-specific data structure may provide at least data indicative of a primary context or a combination of one or more primary contexts associated with selected ones of the recommendations, data indicative of a secondary context or a combination of one or more secondary contexts, meta-content information related to data that has been recommended, and meta content related to functional activities related to content that is connectable to specific functions of the device.

In a further example embodiment, an apparatus for providing a user interface in connection with a content recommendation service may include means for causing communication of a request for content where the request includes context information and preference information associated with a user of a device causing communication of the request, means for receiving a response to the request in response to the request being serviceable where the response includes a series of recommendations serialized in protocol-specific data structure, and means for causing rendering of content associated with the recommendations as graphical tiles according to the protocol-specific data structure such that a plurality of recommendations associated with a same primary context are associated with each other in a common channel. The protocol-specific data structure may provide at least data indicative of a primary context or a combination of one or more primary contexts associated with selected ones of the recommendations, data indicative of a secondary context or a combination of one or more secondary contexts, meta-content information related to data that has been recommended, and meta content related to functional activities related to content that is connectable to specific functions of the device.

BRIEF DESCRIPTION OF THE SEVERAL VIEWS OF THE DRAWING(S)

Having thus described embodiments of the present disclosure in general terms, reference will now be made to the accompanying drawings, which are not necessarily drawn to scale, and wherein:

DETAILED DESCRIPTION

Figure 1:
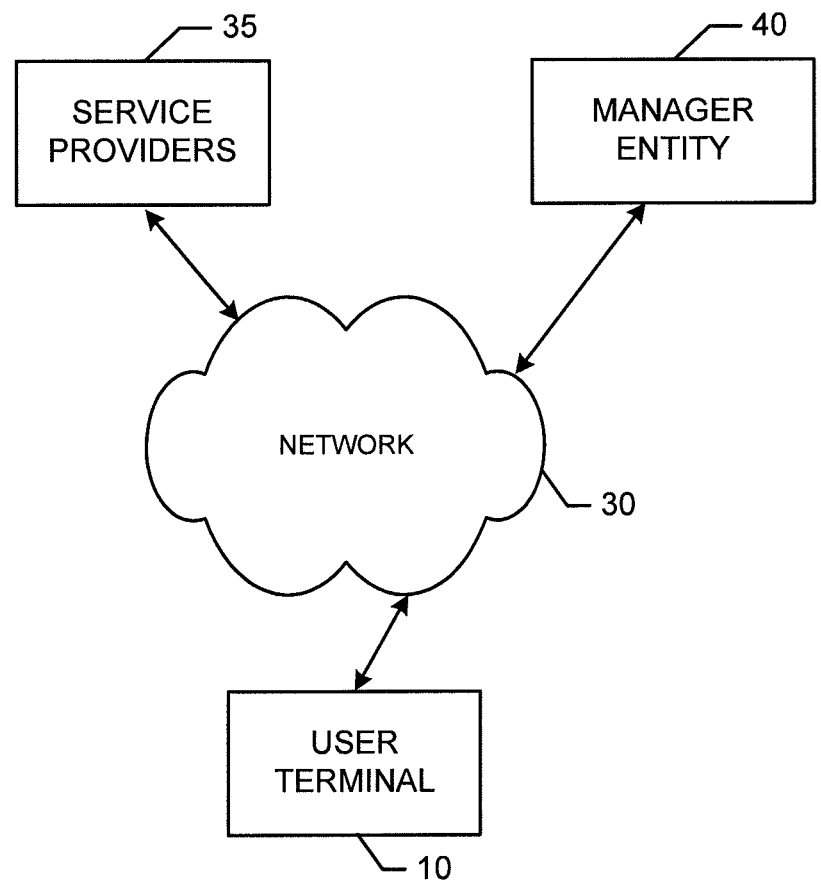
FIG. 1 illustrates a schematic block diagram of a system according to an example embodiment of the present invention.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

As used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a computer-readable storage medium, which refers to a non-transitory, physical storage medium (e.g., volatile or non-volatile memory device), can be differentiated from a computer-readable transmission medium, which refers to an electromagnetic signal.

As indicated above, some embodiments of the present invention may be employed in methods, apparatuses and computer program products configured to recommend content to users based on context information. A service associated with recommending content may, for example, recommend URLs (uniform resource locators) directly to a display or home screen of a user device. The recommendations may be based on determinations regarding context for the device and/or the user. In some cases, the recommendations may further consider user preferences that have been previously provided by the user or that have been determined based on user behavior. In some examples, a server device may process requests that arrive from a client device so that the server device is enabled to send a response to the request, where the response includes the recommended content, for example recommended URLs. The user may then click on one or more of those URLs to open them using, for example, a browser.

In the future, large amounts of context data and preference data may be used when recommending content to users. Users will want to feel both informed and safe when employing such recommendation services, and thus the users should not receive content that creates confusion. To avoid confusing users in relation to the provision of recommended content, some example embodiments enable recommended content to be provided with description information to describe the situations under which a recommendation is made (context), why that recommendation was made (indicating user preference) and the recommended content is provided using an appropriate user interface (UI). Accordingly, some example embodiments may expand the capabilities of a recommendation service with respect to the provision of a user interface that includes intuitive cues to the user (e.g., both in terms of context and semantic meta-content of the content itself) via application programming interface (API) extensions. As such, a new paradigm is provided that may be suitable for multiple types of content associated with external services or local frameworks. In this regard, for example, FIG. 1 illustrates a block diagram of a system that may benefit from embodiments of the present invention. It should be understood, however, that the system as illustrated and hereinafter described is merely illustrative of one system that may benefit from an example embodiment of the present invention and, therefore, should not be taken to limit the scope of embodiments of the present invention.

As shown in FIG. 1, a system in accordance with an example embodiment of the present invention may include a user terminal 10. The user terminal 10 may be any of multiple types of fixed or mobile communication and/or computing devices such as, for example, personal digital assistants (PDAs), pagers, mobile televisions, mobile telephones, gaming devices, laptop computers, personal computers (PCs), cameras, camera phones, video recorders, audio/video players, radios, global positioning system (GPS) devices, or any combination of the aforementioned, which employ an embodiment of the present invention.

In some embodiments the user terminal 10 may be capable of communicating with other devices, either directly, or via a network 30. The network 30 may include a collection of various different nodes, devices or functions that may be in communication with each other via corresponding wired and/or wireless interfaces. As such, the illustration of FIG. 1 should be understood to be an example of a broad view of certain elements of the system and not an all inclusive or detailed view of the system or the network 30. Although not necessary, in some embodiments, the network 30 may be capable of supporting communication in accordance with any one or more of a number of first-generation (1G), second-generation (2G), 2.5G, third-generation (3G), 3.5G, 3.9G, fourth-generation (4G) mobile communication protocols, Long Term Evolution (LTE), and/or the like. Thus, the network 30 may be a cellular network, a mobile network and/or a data network, such as a local area network (LAN), a metropolitan area network (MAN), and/or a wide area network (WAN), for example, the Internet. In turn, other devices such as processing elements (for example, personal computers, server computers or the like) may be included in or coupled to the network 30. By directly or indirectly connecting the user terminal 10 and the other devices to the network 30, the user terminal and/or the other devices may be enabled to communicate with each other, for example, according to numerous communication protocols including Hypertext Transfer Protocol (HTTP) and/or the like, to thereby carry out various communication or other functions of the user terminal and the other devices, respectively. As such, the user terminal 10 and the other devices may be enabled to communicate with the network 30 and/or each other by any of numerous different access mechanisms. For example, mobile access mechanisms such as wideband code division multiple access (W-CDMA), CDMA2000, global system for mobile communications (GSM), general packet radio service (GPRS) and/or the like may be supported as well as wireless access mechanisms such as wireless LAN (WLAN), Worldwide Interoperability for Microwave Access (WiMAX), WiFi, ultra-wide band (UWB), Wibree techniques and/or the like and fixed access mechanisms such as digital subscriber line (DSL), cable modems, Ethernet and/or the like. Thus, for example, the network 30 may be a home network or other network providing local connectivity.

The user terminal 10 may be configured to request, receive, and output Uniform Resource Locators (URLs), text, pictures, data, audio, video, and/or various other embodiments and media formats of content segments. In some embodiments the content may be recommended for, and/or provided to, the user terminal 10 by one or more of a plurality of service providers 35 that may employ respective content provision models to select the content segments. One or more of the service providers 35 may be embodied as a server, server bank or other computer or other computing device or node configured to recommend and provide content segments to the user terminal 10. Each of the service providers 35 may have any number of functions or associations with various services. As such, for example, one or more of the service providers 35 may be a platform such as a dedicated server (or server bank), or one or more of the service providers may be a backend server associated with one or more other functions or services. Thus, the service providers 35 may employ respective content provision models to recommend and/or provide content to the user terminal 10 for use by a user thereof. Accordingly, the service providers 35 may embody a content provider and/or a content recommender in some embodiments.

In some embodiments the service providers 35 may be configured to recommend and/or provide content to the user terminal 10 only within the bounds of respective spatial regions. For example, each of the service providers 35 may have a spatial region associated therewith. By way of further example, each of the service providers may have a mutually exclusive spatial region associated therewith. Thereby, each of the service providers 35 may be configured to recommend and/or provide content to the user terminal 10 only when the user terminal is located within the respective spatial regions. In some embodiments each service provider 35 may have its own business model and content provision models associated therewith. For example, one service provider 35 may provide advertisements along with recommendations, whereas other service providers might charge for the content recommendation service while another service provider may charge data providers for recommending their content.

In some embodiments the system may further comprise a manager entity 40. The manager entity 40 may be configured to coordinate the provision and/or recommendation of the content segments by the service providers 35. For example, the manager entity 40 may register user terminals 10 and/or service providers 35 and/or provide for transfer between the various content provision models of the service providers 35 based on a change in the recipient region (e.g. the spatial region in which the user terminal is positioned). The manager entity 40 may be embodied as a server, server bank or other computer or other computing device or node configured to coordinate the provision and/or recommendation of the content segments by the various service providers 35, as discussed above. The manager entity 40 may have any number of functions or associations with various services. As such, for example, the manager entity 40 may be a platform such as a dedicated server (or server bank), or one or more of the service providers may be a backend server associated with one or more other functions or services.

Figure 2:
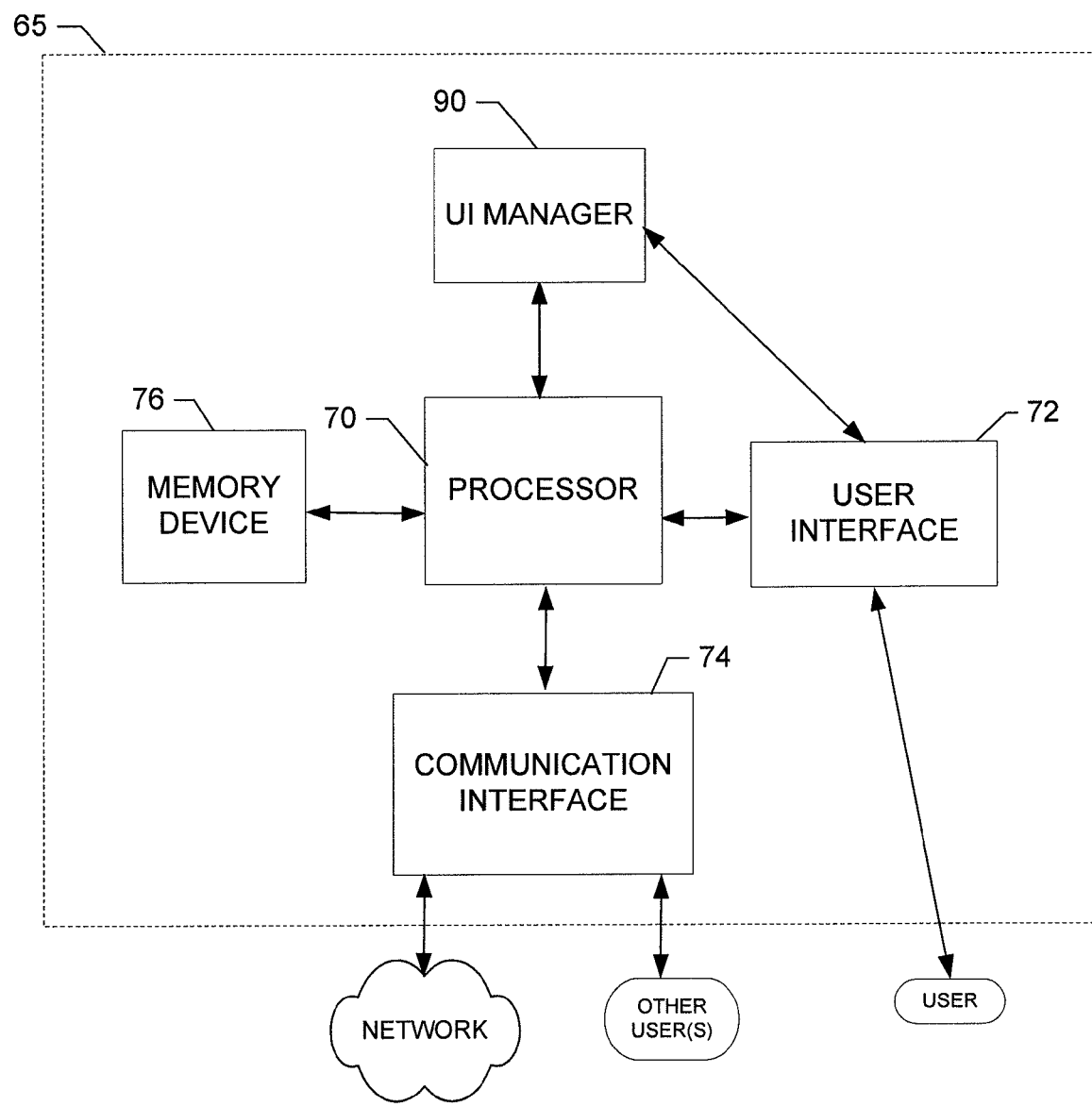
FIG. 2 illustrates a schematic block diagram of an apparatus configured to provide a user interface in connection with a content recommendation service according to an example embodiment of the present invention.

In example embodiments illustrated in FIG. 2, an apparatus 65 is provided that may be employed by devices performing example embodiments of the present invention. The apparatus 65 may be embodied, for example, as any device hosting, including, controlling, comprising, or otherwise forming a portion of the user terminal 10, the service providers 35, and/or the manager entity 40. However, embodiments may also be embodied on a plurality of other devices such as for example where instances of the apparatus 65 may be embodied on the network 30. As such, embodiments of the apparatus 65 illustrated in FIG. 2 are merely examples and may include more, or in some cases, less than the components shown in FIG. 2.

With further regard to FIG. 2, the apparatus 65 may be configured to provide for recommendation of content based on content provision models associated with spatial regions by itself forming the recommendation or, conversely, receiving the embodiment depending on whether the apparatus is embodied as the manager entity 40 or the user terminal 10, for example. As depicted in FIG. 2, the apparatus 65 may include or otherwise be in communication with a processor 70, a user interface 72, a communication interface 74 and a memory device 76. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, applications, instructions or the like for enabling the apparatus to carry out various functions in accordance with example embodiments of the present invention. For example, the memory device 76 could be configured to buffer input data for processing by the processor 70. Additionally or alternatively, the memory device 76 could be configured to store instructions for execution by the processor 70.

The apparatus 65 may, in some embodiments, be a network device (e.g., service provider 35 or manager entity 40) or other devices (e.g., the user terminal 10) that may operate independent of or in connection with a network. However, in some embodiments, the apparatus 65 may be instantiated at one or more of the service provider 35, manager entity 40, or the user terminal 10. Thus, the apparatus 65 may be any computing device configured to employ an example embodiment of the present invention. However, in some embodiments, the apparatus 65 may be embodied as a chip or chip set (which may in turn be employed at one of the devices mentioned above). In other words, the apparatus 65 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 65 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB), Ethernet, High-Definition Multimedia Interface (HDMI) or other mechanisms. Furthermore, the communication interface 74 may include hardware and/or software for supporting communication mechanisms such as BLUETOOTH®, Infrared, UWB, WiFi, and/or the like, which are being increasingly employed in connection with providing home connectivity solutions.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen(s), touch areas, soft keys, a microphone, a speaker, or other input/output mechanisms. In an example embodiment in which the apparatus 65 is embodied as a server or some other network devices, the user interface 72 may be limited, or eliminated. However, in an embodiment in which the apparatus 65 is embodied as a communication device (e.g., the user terminal 10), the user interface 72 may include, among other devices or elements, any or all of a speaker, a microphone, a display, and a keyboard or the like. In this regard, for example, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In an example embodiment, the processor 70 may be embodied as, include or otherwise control a UI manager 90. As such, in some embodiments, the processor 70 may be said to cause, direct or control the execution or occurrence of the various functions attributed to the UI manager 90 as described herein. The UI manager 90 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the UI manager 90 as described herein. Thus, in examples in which software is employed, a device or circuitry (e.g., the processor 70 in one example) executing the software forms the structure associated with such means.

The UI manager 90 may be configured to provide a service API extension in order to modify the UI to be presented to the user of a client device, based on the context information and/or preference information that is associated with a specific request (or response). As such, it can be assumed that the UI manager 90 is used in connection with a service (e.g., provided by the service providers 35) for providing recommended content. Then, when the recommended content is received, the UI manager 90 may extract information (e.g., context and/or preference information) in order to generate an appropriate user interface as described herein. As such, for example, the UI manager 90 may be configured to cause communication of a request for content where the request includes context information and preference information associated with a user of a device causing communication of the request. The UI manager 90 may also be configured to receive a response to the request in response to the request being serviceable. The response may include a series of recommendations serialized in an XML data structure. The XML data structure may provide at least data indicative of a primary context or a combination of one or more primary contexts associated with selected ones of the recommendations, data indicative of a secondary context or a combination of one or more secondary contexts, meta-content information related to data that has been recommended, and/or meta content related to functional activities related to content that is connectable to specific functions of the device. The UI manager 90 may be further configured to cause rendering of content associated with the recommendations as graphical tiles according to the protocol-specific data structure such that a plurality of recommendations associated with a same primary context are associated with each other in a common channel.

In an example embodiment, while the UI manager 90 may have a function associated with user interface generation, the UI manager 90 may also be configured to provide additional services (or interact with other modules or entities that provide such services in order to provide functionalities according to an example embodiment). As such, for example, the UI manager 90 may configured to provide services (or interact with another module providing services) relating to handling settings (e.g., manual and automatic settings) related to client device operation (e.g., for UI rendering). The UI manager 90 may also be configured to handle context sourcing and interaction as well as message parsing. The UI manager 90 may also be configured to handle interaction monitoring and responses along with directing rendering of content (e.g., via the user interface 72) and logging of events. As such, in some cases, the UI manager 90 may act as, control or interact with a rendering engine and/or a log engine. The UI manager 90 may also be configured to handle profile monitoring and management as well as implicit and explicit user login management. In some cases, the UI manager 90 may further include or interact with a device profile manager and handle recommendation caching and memory management.

In relation to the function of the UI manager 90 for providing a service API extension to modify the UI to be presented to a user of a client device, based on the context information and/or preference information that is associated with a specific request (or response), each HTTP GET request that is received from a client device to request content may include embedded context information and preference information. In an example embodiment, the service providers 35 and/or the manager entity 40 may process the request. A 200 OK response may also be provided if the request can be serviced. The response may include a series of recommendations that may be serialized in XML to be rendered by the client device. In some embodiments, the GET Response may be extended by the UI extender 90 as provided below:

```
<>
<rec id=...>Title</rec>
    <primary context>location</primarycontext>
    <secondarycontext>
        <li>
            <item>Time<item>
            <item type=country value="China"/>
        </li>
    </secondarycontext>
    <channel type="restaurant ">
        <order value=1/>
    </channel>
    <recommendationContext>
        <location>
            <lat></lat>
            <lon></lon>
        </location>
        <time></time>
    </recommendationContext>
    <meta-content>
        <price sign="dollar" value=2/>
        <time type=open>08:00 - 22:00</time>
        <rating type="*" value=5 />
    </meta-content>
    <functional-content>
        <contact type=tel>+3585004789</contact>
        <contact type=email> contact@restuarant.com </contact>
        <contact type=fax>+35890033567</contact>
        <url> www.restaurant.com </url>
    </functional-content>
    <shortdescription>......</shortdescription>
    <longdescription>......</longdescription>
    <review no=20>.... </review>
</>
```

This extension may provide a specific XML data structure for UI rendering. In an example embodiment, generally speaking, the UI manager 90 (e.g., via the API extension provided thereby) may be configured to provide data on primary context or a combination of one or more primary contexts under which a recommendation is made. Data may also be provided as to a secondary context or a combination of secondary contexts (e.g., having less significance with respect to determining an outcome of a recommendation than a primary context). Meta-content information related to data that has been recommended may also contain meta-content related to functional activities related to recommended content that can be connected to specific functions (e.g., a phone number to a restaurant, email address) on a device. Functionalities may therefore be provided through the user interface by activating functional calls to specific platform APIs referred within the meta-content segments.

Figure 3:
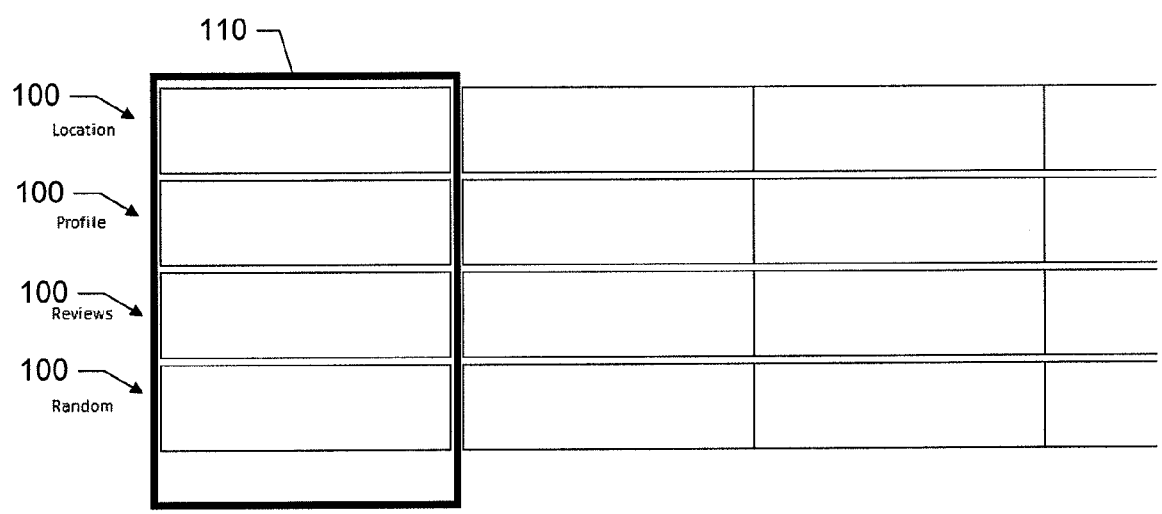
FIG. 3 illustrates an example of a user interface for multi-context recommendation display according to an example embodiment.

FIG. 3 illustrates an example of a user interface for multi-context recommendation display according to an example embodiment. As shown in FIG. 3, each content item being recommended that belongs to a primary context may be grouped together in a list or channel 100. Although any number of channels is possible, FIG. 3 shows four channels (one for location, one for profile, one for reviews and one random channel) in a view pane 110 of a display device. Each channel 100 may define a horizontal scroll block associated with the primary context (such as location, profile, reviews, random as shown in FIG. 3). As such, content that is positioned to the right of the view pane 110 is actually content within the same channel as other content that is aligned horizontally and is not displayed, but could be with a scrolling operation. Since content belonging to the primary context is grouped together in the channel 100, vertical scrolling may enable shifting to a different primary context and a different corresponding channel. Horizontal scrolling enables shifting between items of a single channel.

Figure 4:
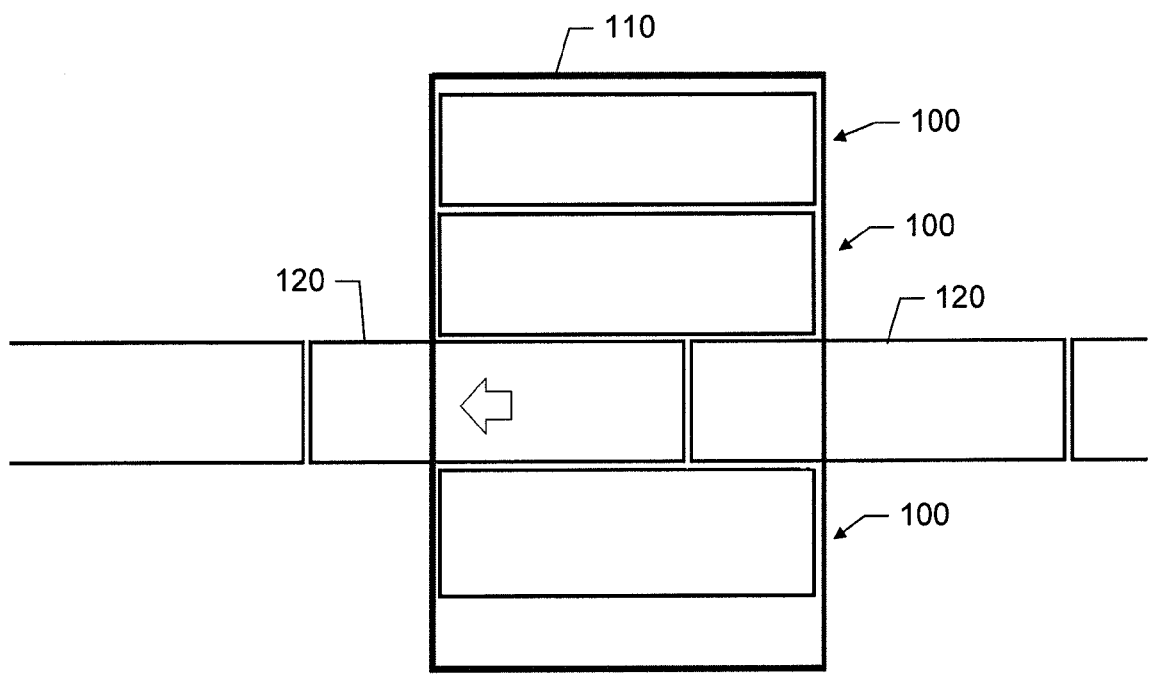
FIG. 4 illustrates an example of a user interface performing a drag interaction in connection with a multi-context recommendation display according to an example embodiment.

In another embodiment, there may be a static list of channels that may be shown by a client device and the channels may be vertically scrolled. Meanwhile, as shown in FIG. 4, items 120 within the channel may be horizontally scrolled. In embodiments where there are less number of content channels that are recommended than can be accommodated on the screen, space may be evenly shared by those recommendations that are provided. Furthermore, in some cases, historical recommendations may be shown as lower priority items in free space. In some embodiments, a size of the channel 100 may be increased by dragging the channel 100 down or expanding boundaries defining the channel 100. In an example embodiment, dragging the channel 100 to consume at least a specified portion of the display size (e.g., a quarter or half of a display screen) may cause a snap fit operation so that the channel 100 snaps to fit a corresponding portion of the display (e.g., snap to fit a quarter or half of the display). In some cases, the portion to which the channel 100 snaps to fit, may be a function of the number of channels displayed.

In an example embodiment, the user may be enabled to remove a channel by a press and hold operation. In some cases, however, the press and hold operation may cause display of a menu option and one of the selectable options in the menu may include discarding of the channel. Other menu options may also be provided, such as an option for saving the contents of a channel. A user can browse the content of a channel (e.g., channel 100) by clicking on an individual recommendation within the channel or by moving right to left or left to right. When content is selected (e.g., by clicking on the content), a detailed view of the content may be opened.

In some embodiments, the user may be enabled to provide settings (e.g., via the UI manager 90) to identify a maximum host for each channel, a maximum number of channels to display, and/or other details regarding how the channels are to be displayed. In some cases, the user may be enabled to prioritize a particular context type as a priority context type. By specifying a priority context type, higher priority context types may be presented in a more prominent fashion (e.g., high priority items displayed on top, with other items displayed in descending order of priority as defined by the user). In some embodiments, the user may also define certain channels via a settings menu where a combination of context types and values can be defined. As such, standard recommendations (e.g., from the service providers 35) may be bypassed so that the client device (e.g., user terminal 10) may send this when those context values match the server (to be expanded and more clearly defined).

Figure 5:
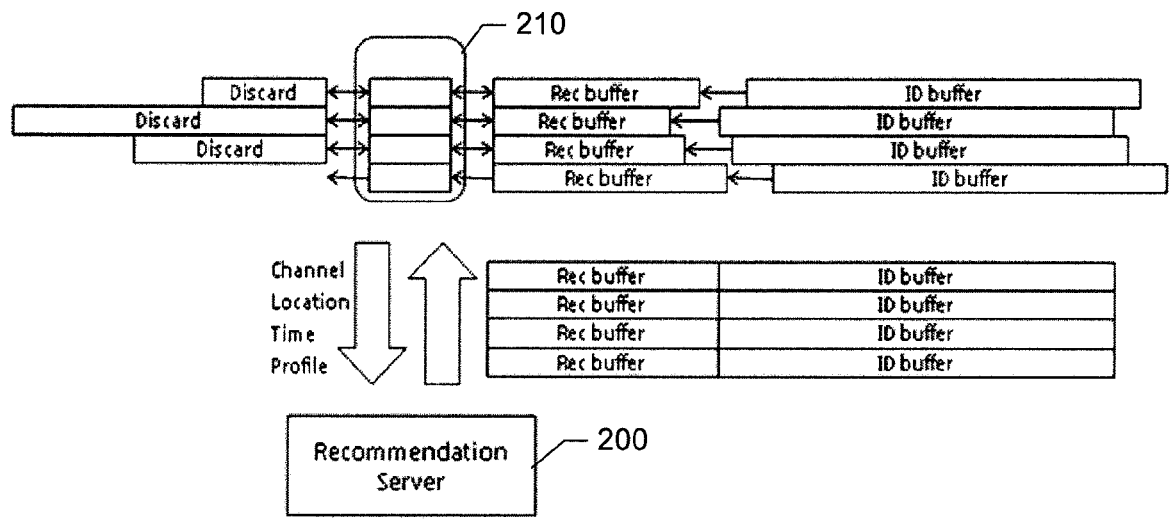
FIG. 5 illustrates an example of data flow and usage of buffers in association with an example embodiment.

FIG. 5 illustrates an example of data flow and usage of buffers in association with an example embodiment. As shown in FIG. 5, a recommendation server 200 (e.g., one of the service providers 35) may interact with a client device 210 to send recommendation data to the client device 210. The recommendation data may be displayed in a channel as described above according to an example embodiment. The recommendation data may be provided in consideration of user context and preferences as indicated by the location, time and profile data that can be exchanged by the client device 210 and the recommendation server 200. Each recommendation may be stored in a corresponding buffer with a corresponding buffer ID if the data is saved as described above, or the recommendations may be discarded as described above.

Figure 6:
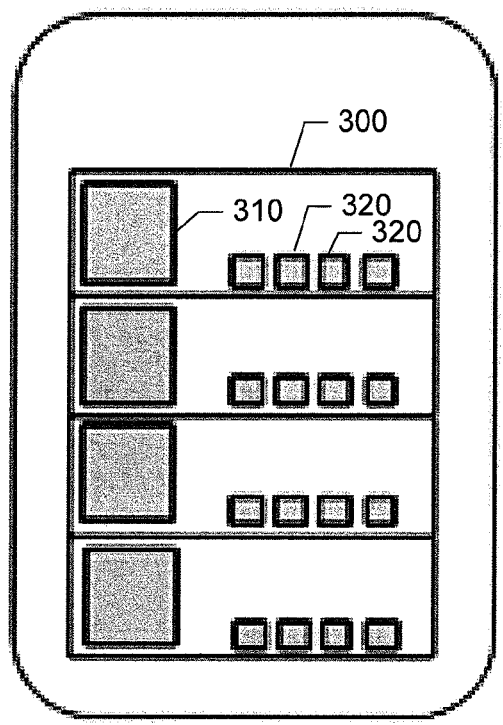
FIG. 6 illustrates an example user interface having a singe content row with primary and secondary context identification according to an example embodiment.
Figure 7:
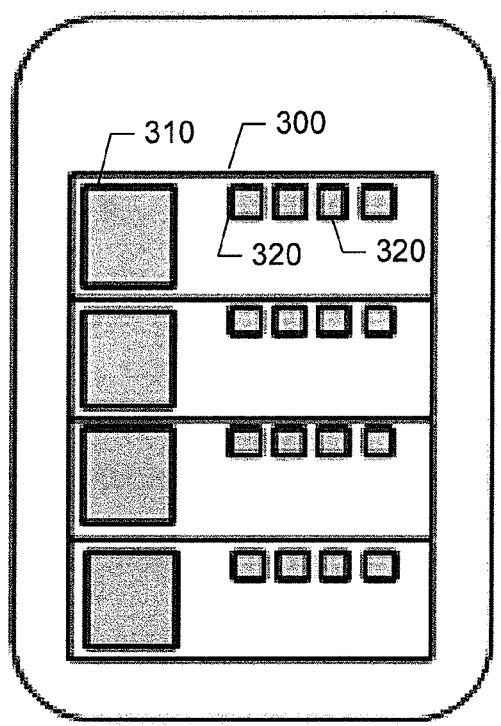
FIG. 7 illustrates an example user interface having a singe content row with primary and secondary context identification according to an alternative example embodiment.

In some cases, content may be provided such that the content is provided in rows as shown in FIGS. 6 and 7. In FIG. 6, a single content row is displayed within a display view. The content includes a plurality of recommendations 300 where each recommendation includes a corresponding indication of the primary context and multiple secondary contexts associated with the recommendation. In the example of FIGS. 6 and 7, a primary context indicator 310 is provided on the left side of the recommendation 300. However, the primary context indicator 310 could be provided at some other position in the recommendation as well. Similarly, the positions at which secondary context indicators 320 (or meta-content indicators) are provided may also be varied in different examples. In FIG. 6, the secondary context indicators 320 are positioned at the bottom of the recommendation 300, while the secondary context indicators 320 are positioned at the top in FIG. 7.

Figure 8:
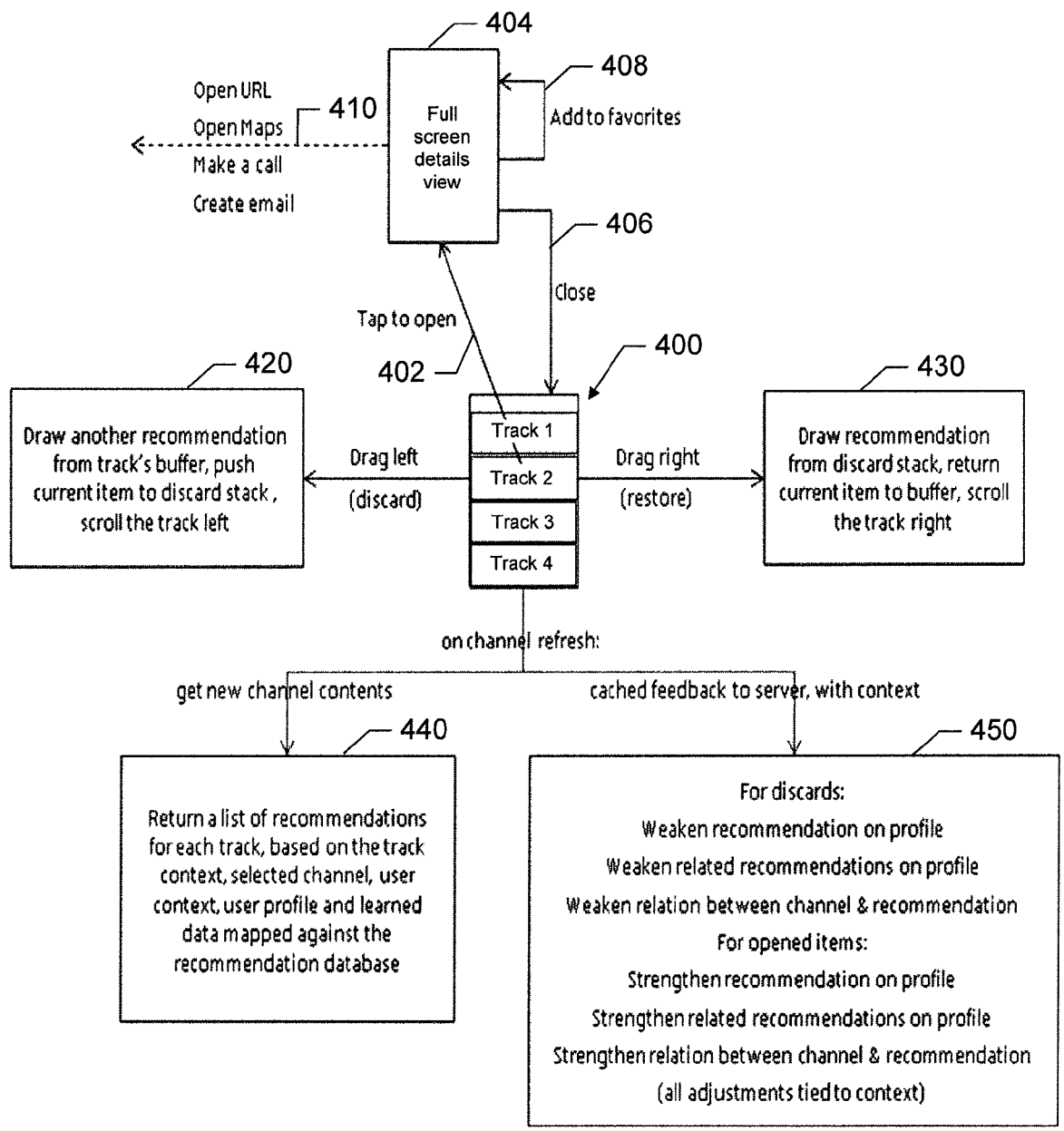
FIG. 8 illustrates a UI flow diagram of operation according to an example embodiment of the present invention.

FIG. 8 illustrates a UI flow diagram of operation according to an example embodiment. In FIG. 8, multiple tracks (e.g., track 1, track 2, track 3 and track 4) corresponding to recommendations may be provided in a channel view 400. In response to user tapping to select one of the tracks (as indicated by arrow 402), the full screen details of the corresponding track may be provided in a full screen detail view 404. If the full screen detail view 404 is closed, the channel view 400 may again be displayed (as indicated by arrow 406). The track may be added to a favorites list (as indicated by arrow 408). In some cases, the track that is selected may be further used to open a URL, open a map, make a call, create an email or undertake other functionality (as indicated by arrow 410).

By performing a drag operation (e.g., drag left) another recommendation may be drawn from a track buffer (e.g., recommendation buffer) to push a currently displayed item or track to the discard stack and scroll the track left as shown at operation 420. In some cases, discarding a track may not result in permanent deletion, but just placement of the track in a discard stack (at least for a predetermined period of time). By performing a different drag operation (e.g., drag right) a recommendation may be withdrawn from the discard stack and returned to a track buffer while the track is scrolled to the right at shown at operation 430.

In an example embodiment, if a channel is refreshed or a different channel is selected, a list of recommendations for each track may be provided. The list may be generated based on the track context, selected channel, user context, user profile and learned data that may be mapped against a recommendation database as indicated at operation 440. Cached feedback may also be provided, with context, to the server as indicated at operation 450. In this regard, for discards, an association of the recommendation to a corresponding profile may be weakened along with any related recommendations and the relationship between the recommendation and the corresponding channel. For opened items, an association of the recommendation to a corresponding profile may be strengthened along with any related recommendations and the relationship between the recommendation and the corresponding channel.

Example embodiments may therefore enable multiple content types to be provided on one UI screen while also providing an intuitive interaction with the UI screen via such operations as dragging and/or scrolling. Horizontal and vertical scrolling may be adapted to a matrix-like UI in a multi-content framework to provide a highly configurable interface employing both manual and automatic configuration options. Example embodiments may also provide a relatively limitless ability to host content with no ambiguity on content segregation. Clear information may therefore be provided to the user including usage of primary context information and semantic meta-content. Some example embodiments may be used with an evolved and/or powerful server that may be configured as a recommendation platform and may be flexible to the point that they may be extended to use with a three dimensional (3D) user interface. Example embodiments may also be easily adapted to use with touch screen displays.

Figure 9:
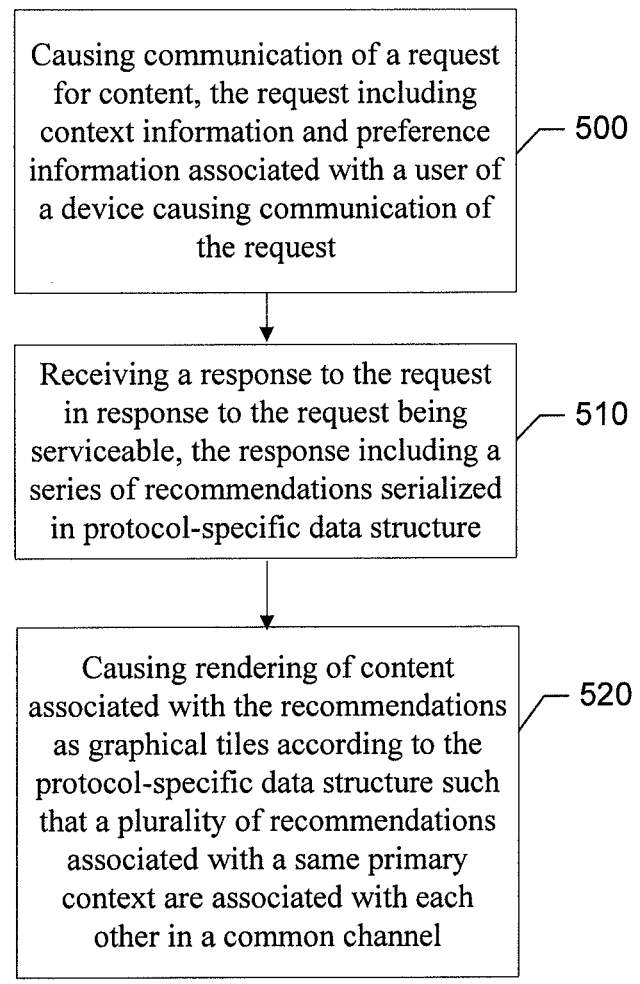
FIG. 9 illustrates a flowchart of operations associated with a method of providing a user interface in connection with a content recommendation service according to an example embodiment of the present invention.

FIG. 9 is a flowchart of a system, method and program product according to example embodiments of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus embody a mechanism for implementing the functions specified in the flowchart block(s). These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIG. 9, when executed, convert a computer or processing circuitry into a particular machine configured to perform an example embodiment of the present invention. Accordingly, the operations of FIG. 9 define an algorithm for configuring a computer or processing circuitry (e.g., processor 70) to perform an example embodiment. In some cases, a general purpose computer may be provided with an instance of the UI manager 90, which performs the algorithm shown in FIG. 9 (e.g., via configuration of the processor 70), to transform the general purpose computer into a particular machine configured to perform an example embodiment.

Accordingly, blocks of the flowchart support combinations of means for performing the specified functions, combinations of operations for performing the specified functions and program instructions for performing the specified functions. It will also be understood that one or more blocks of the flowchart, and combinations of blocks in the flowchart, can be implemented by special purpose hardware-based computer systems which perform the specified functions or operations, or combinations of special purpose hardware and computer instructions.

In this regard, one embodiment of a method according to an example embodiment as shown in FIG. 9 may include causing communication of a request for content where the request includes context information and preference information associated with a user of a device causing communication of the request at operation 500, receiving a response to the request in response to the request being serviceable where the response includes a series of recommendations serialized in protocol-specific data structure at operation 510, and causing rendering of content associated with the recommendations as graphical tiles according to the protocol-specific data structure such that a plurality of recommendations associated with a same primary context are associated with each other in a common channel at operation 520. The protocol-specific data structure may provide at least data indicative of a primary context or a combination of one or more primary contexts associated with selected ones of the recommendations, data indicative of a secondary context or a combination of one or more secondary contexts, meta-content information related to data that has been recommended, and meta content related to functional activities related to content that is connectable to specific functions of the device.

In some embodiments, certain ones of the operations above may be modified or further amplified as described below. Moreover, in some embodiments additional optional operations may also be included. It should be appreciated that each of the modifications, optional additions or amplifications below may be included with the operations above either alone or in combination with any others among the features described herein. In an example embodiment, the protocol specific data structure may be an extensible markup language (XML) data structure. In some embodiments, receiving the response may include receiving the response as one or more uniform resource locator (URL) recommendations. In some cases, causing rendering of the content may include grouping recommendations in the common channel such that employing a scrolling function initiates presentation of another group with a corresponding different primary context. In an example embodiment, causing rendering of the content may include causing presentation of secondary context categories in connection with each of the graphical tiles. In some embodiments, causing rendering of the content comprises enabling employment of a scrolling function to move between graphical tiles having corresponding different secondary contexts. In an example embodiment, causing rendering of the content may include causing rendering of the common channel such that horizontal scrolling alters the graphical tiles associated with the same primary context and vertical scrolling alters the primary context.

In an example embodiment, an apparatus for performing the method of FIG. 9 above may comprise a processor (e.g., the processor 70) configured to perform some or each of the operations (500-520) described above. The processor 70 may, for example, be configured to perform the operations (500-520) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 500-520 may comprise, for example, the UI manager 90. Additionally or alternatively, at least by virtue of the fact that the processor 70 may be configured to control or even be embodied as the UI manager 90, the processor 70 and/or a device or circuitry for executing instructions or executing an algorithm for processing information as described above may also form example means for performing operations 500-520.

An example of an apparatus according to an example embodiment may include at least one processor and at least one memory including computer program code. The at least one memory and the computer program code may be configured to, with the at least one processor, cause the apparatus to perform the operations 500-520 (with or without the modifications and amplifications described above in any combination).

An example of a computer program product according to an example embodiment may include at least one computer-readable storage medium having computer-executable program code portions stored therein. The computer-executable program code portions may include program code instructions for performing operation 500-520 (with or without the modifications and amplifications described above in any combination).

In some cases, the operations (500-520) described above, along with any of the modifications may be implemented in a method that involves facilitating access to at least one interface to allow access to at least one service via at least one network. In such cases, the at least one service may be said to perform at least operations 500-520.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
    causing communication of a request for content, the request including context information and preference information associated with a user of a device causing communication of the request;
    receiving a response to the request in response to the request being serviceable, the response including a series of recommendations serialized in a protocol-specific data structure, the protocol-specific data structure providing at least:
        data indicative of a primary context or a combination of one or more primary contexts associated with selected ones of the recommendations,
        data indicative of a secondary context or a combination of one or more secondary contexts,
        meta-content information related to data that has been recommended, and
        meta content related to functional activities related to content that is connectable to specific functions of the device; and
    causing rendering of content associated with the recommendations as graphical tiles according to the protocol-specific data structure such that a plurality of recommendations associated with a same primary context are associated with each other in a common channel, wherein causing rendering of the content comprises causing presentation of secondary context categories in connection with each of the graphical tiles, and wherein causing rendering of the content comprises grouping recommendations in the common channel such that employing a scrolling function initiates presentation of another group with a corresponding different primary context.

2. The method of claim 1, wherein the protocol specific data structure is an extensible markup language (XML) data structure.

3. The method of claim 1, wherein receiving the response comprises receiving the response as one or more uniform resource locator (URL) recommendations.

4. The method of claim 1, wherein causing rendering of the content comprises enabling employment of a scrolling function to move between graphical tiles having corresponding different secondary contexts.

5. The method of claim 1, wherein causing rendering of the content comprises causing rendering of the common channel such that horizontal scrolling alters the graphical tiles associated with the same primary context and vertical scrolling alters the primary context.

6. An apparatus comprising at least one processor and at least one memory including computer program code, the at least one memory and the computer program code configured to, with the at least one processor, cause the apparatus to at least:
    cause communication of a request for content, the request including context information and preference information associated with a user of a device causing communication of the request;
    receive a response to the request in response to the request being serviceable, the response including a series of recommendations serialized in a protocol-specific data structure, the protocol-specific data structure providing at least:
        data indicative of a primary context or a combination of one or more primary contexts associated with selected ones of the recommendations,
        data indicative of a secondary context or a combination of one or more secondary contexts,
        meta-content information related to data that has been recommended, and
        meta content related to functional activities related to content that is connectable to specific functions of the device; and
    cause rendering of content associated with the recommendations as graphical tiles according to the protocol-specific data structure such that a plurality of recommendations associated with a same primary context are associated with each other in a common channel, wherein causing rendering of the content comprises causing presentation of secondary context categories in connection with each of the graphical tiles, and wherein causing rendering of the content comprises grouping recommendations in the common channel such that employing a scrolling function initiates presentation of another group with a corresponding different primary context.

7. The apparatus of claim 6, wherein the protocol specific data structure is an extensible markup language (XML) data structure.

8. The apparatus of claim 6, wherein the at least one memory and computer program code are configured to, with the at least one processor, cause the apparatus to receive the response by receiving the response as one or more uniform resource locator (URL) recommendations.

9. The apparatus of claim 6, wherein the at least one memory and computer program code are configured to, with the at least one processor, cause the apparatus to cause rendering of the content by enabling employment of a scrolling function to move between graphical tiles having corresponding different secondary contexts.

10. The apparatus of claim 6, wherein the at least one memory and computer program code are configured to, with the at least one processor, cause the apparatus to cause rendering of the content by causing rendering of the content comprises causing rendering of the common channel such that horizontal scrolling alters the graphical tiles associated with the same primary context and vertical scrolling alters the primary context.

11. A computer program product comprising a computer-readable storage medium bearing computer program code stored therein for use with a computer, the computer program code comprising code for:
    causing communication of a request for content, the request including context information and preference information associated with a user of a device causing communication of the request;
    receiving a response to the request in response to the request being serviceable, the response including a series of recommendations serialized in a protocol-specific data structure, the protocol-specific data structure providing at least:
        data indicative of a primary context or a combination of one or more primary contexts associated with selected ones of the recommendations,
        data indicative of a secondary context or a combination of one or more secondary contexts,
        meta-content information related to data that has been recommended, and
        meta content related to functional activities related to content that is connectable to specific functions of the device; and
    causing rendering of content associated with the recommendations as graphical tiles according to the protocol-specific data structure such that a plurality of recommendations associated with a same primary context are associated with each other in a common channel, wherein causing rendering of the content comprises causing presentation of secondary context categories in connection with each of the graphical tiles, and wherein causing rendering of the content comprises grouping recommendations in the common channel such that employing a scrolling function initiates presentation of another group with a corresponding different primary context.

12. The computer program product of claim 11, wherein the protocol specific data structure is an extensible markup language (XML) data structure.

13. The computer program product of claim 11, wherein code for receiving the response comprises code for receiving the response as one or more uniform resource locator (URL) recommendations.

14. The computer program product of claim 11, wherein code for causing rendering of the content comprises code for enabling employment of a scrolling function to move between graphical tiles having corresponding different secondary contexts.

* * * * *